(12) United States Patent
Skliutas et al.

(10) Patent No.: US 7,605,499 B2
(45) Date of Patent: Oct. 20, 2009

(54) SYSTEMS AND METHODS OF DYNAMIC REACTIVE SUPPORT FOR A POWER TRANSMISSION SYSTEM

(75) Inventors: John Paul Skliutas, Clifton Park, NY (US); Bruce Edward English, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/036,343

(22) Filed: Feb. 25, 2008

(65) Prior Publication Data

US 2009/0212643 A1 Aug. 27, 2009

(51) Int. Cl.
*H02J 1/00* (2006.01)

(52) U.S. Cl. ...................................... 307/103
(58) Field of Classification Search .................. 307/103
See application file for complete search history.

(56) References Cited

U.S. PATENT DOCUMENTS 5,392,184 A * 2/1995 Unterlass et al. .............. 361/16

* cited by examiner

*Primary Examiner*—Robert L. Deberadinis
(74) *Attorney, Agent, or Firm*—Sutherland Asbill & Brennan LLP

(57) ABSTRACT

Systems and methods of dynamic reactive power support for a power transmission system are provided. In one embodiment, a method of dynamic reactive power support for a power transmission system includes at least one circuit breaker connecting a shunt capacitor bank containing at least one shunt capacitor with a metal oxide varistor (MOV) connected in parallel. A controller is used to detect a voltage drop at the power transmission system (e.g., substation bus). In response to detecting the voltage drop, the controller closes the circuit breaker(s) connecting the shunt capacitors to the power transmission system. The controller then monitors at least one MOV to detect a current flow. Upon detection of a current flow in the MOV, the controller disconnects one or more shunt capacitors from the power transmission system by opening one or more circuit breakers. The shunt capacitors may be disconnected simultaneously, sequentially, in groups, or otherwise.

20 Claims, 5 Drawing Sheets

SYSTEMS AND METHODS OF DYNAMIC REACTIVE SUPPORT FOR A POWER TRANSMISSION SYSTEM

FIELD OF THE INVENTION

The invention relates generally to a system and method of providing voltage support, and more particularly, to a system and method of supplying supplemental dynamic reactive power to a power transmission system.

BACKGROUND OF THE INVENTION

Following a voltage depression in a power delivery system caused by a fault and/or outage of a major electric power transmission device such as a transmission line, a large power transformer, or a power plant, power system loads (e.g. induction motor loads) will draw reactive power from the power delivery system in an attempt to recover. This additional reactive power demand will further suppress voltage unless some other source of reactive power is introduced into the system. If voltage suppression lasts long enough, the net reactive power deficit in the system can lead to voltage collapse.

In order to restore voltage under these conditions, reactive power is temporarily supplied to the system that exceeds the normal or rated reactive power demand. However, taking corrective action by providing excess reactive power may also lead to an overvoltage condition if the excess reactive power is supplied to the power delivery system beyond the moment of voltage recovery. Overvoltage conditions will stress system insulation, which can lead to flashovers, equipment damage (e.g., transformers, lightning arresters, etc.), and/or additional system faults.

Traditional solutions to this problem include static VAR compensators (SVC), static compensators using voltage-source converters (STATCOM), and synchronous condensers. However, such devices can be relatively expensive and rely on the active control of high-power semiconductor technology or the inherent transient reactive power capabilities of synchronous machines. Switched shunt capacitor banks have also been used, relying on active controls including voltage measurement and switch timing to open and close breakers to provide reactive power to the system. However, if the reactive power is excessive, the opening of the circuit breakers may not occur fast enough to be effective to control the bus voltage within its normal operating range and a temporary overvoltage may occur.

Therefore, a need exists for a relatively low cost and effective system and method for providing dynamic reactive support to a power transmission system.

BRIEF DESCRIPTION OF THE INVENTION

Some or all of the above needs can be addressed by embodiments of the invention. According to an embodiment of the invention, there is disclosed a method for supplying supplemental reactive power to a transmission system that includes detecting a voltage drop on a power transmission system (e.g., substation bus). In response to detecting a significant voltage drop, one or more shunt capacitors are connected to the power transmission system at the substation including capacitor segments with parallel-connected metal oxide varistors (MOVs). When a current flow in at least one of the MOVs is detected, the associated shunt capacitor segment(s), and other segments as required, are disconnected from the power transmission system.

In accordance with one aspect of the invention, connecting the shunt capacitors to the power transmission system includes closing at least one circuit breaker connecting the power transmission system to the shunt capacitors with at least one MOV connected in parallel. According to another aspect of the invention, closing at least one circuit breaker includes closing two or more circuit breakers sequentially. In accordance with another aspect of the invention, closing at least one circuit breaker includes closing two or more circuit breakers simultaneously.

In accordance with another embodiment of the invention, there is disclosed a system for supplying supplemental reactive power to a transmission system that includes at least one circuit breaker connecting a shunt capacitor bank containing at least one shunt capacitor with at least one metal oxide varistor (MOV). The system further includes a controller configured to detect a voltage drop on a power transmission system, and in response to detecting the voltage drop, close at least one circuit breaker, where closing at least one circuit breaker connects at least one shunt capacitor to the power transmission system. The controller then monitors at least one MOV to detect current flow. Upon detection of a current flow in at least one MOV, the controller disconnects at least one shunt capacitor from the power transmission system.

According to yet another embodiment of the invention, there is disclosed a method for supplying supplemental reactive power to a transmission system that includes detecting a voltage drop at a substation bus. In response to detecting the voltage drop, shunt capacitors are connected to the power transmission system, where at least some shunt capacitors are directly connected to the power transmission system and other shunt capacitors are each connected to the power transmission system with a metal oxide varistor (MOV). Upon detection of a current flow in at least one of the MOVs, the shunt capacitors connected to the power transmission system with a metal oxide varistor (MOV) are disconnected from the power transmission system.

BRIEF DESCRIPTION OF DRAWINGS

Figure 1:
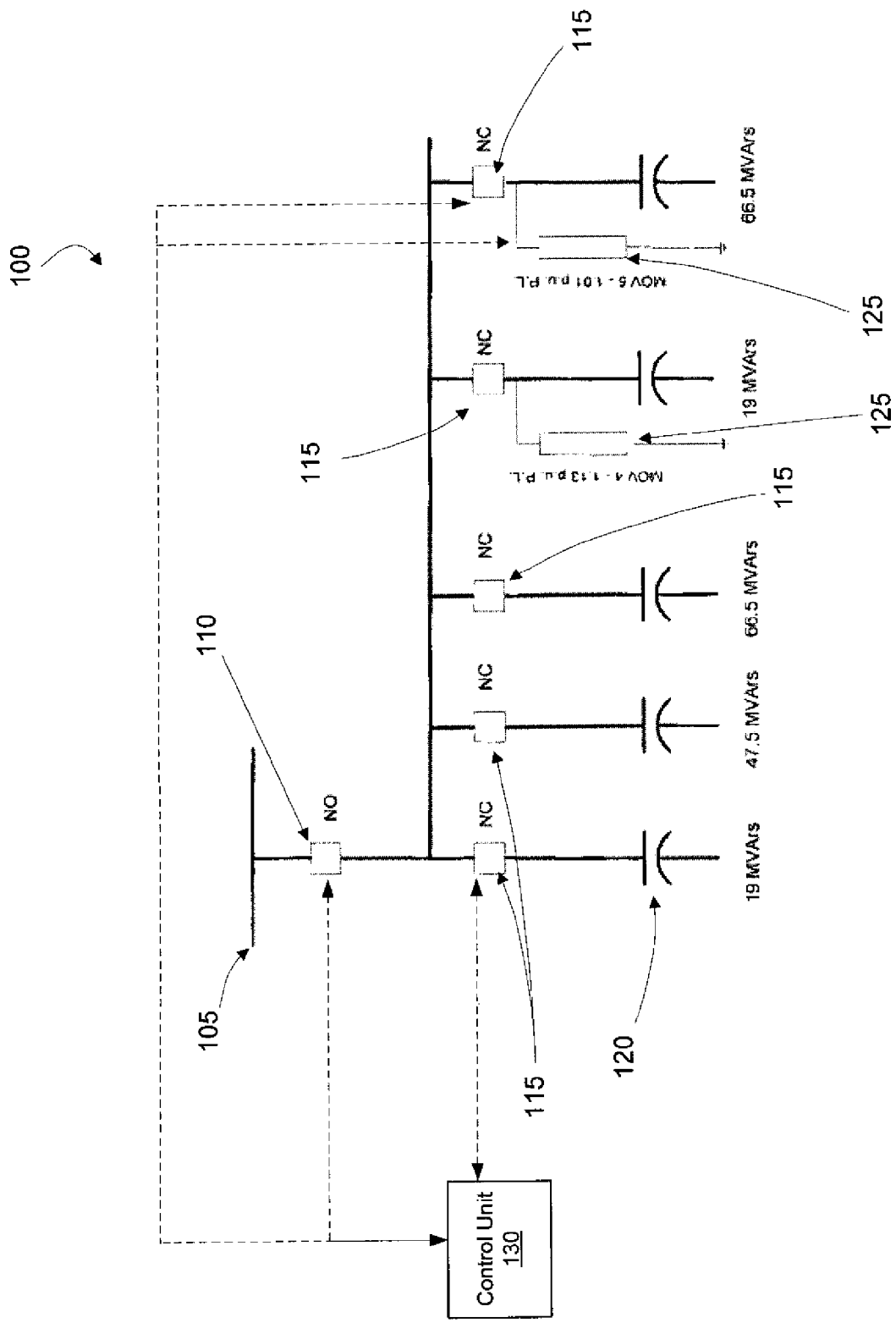

Having thus described the invention in general terms, reference will now be made to the accompanying drawings, which are not necessarily drawn to scale, and wherein:

FIG. 1 shows an example basic dynamic reactive support system configuration in accordance with an embodiment of the invention.

Figure 2:
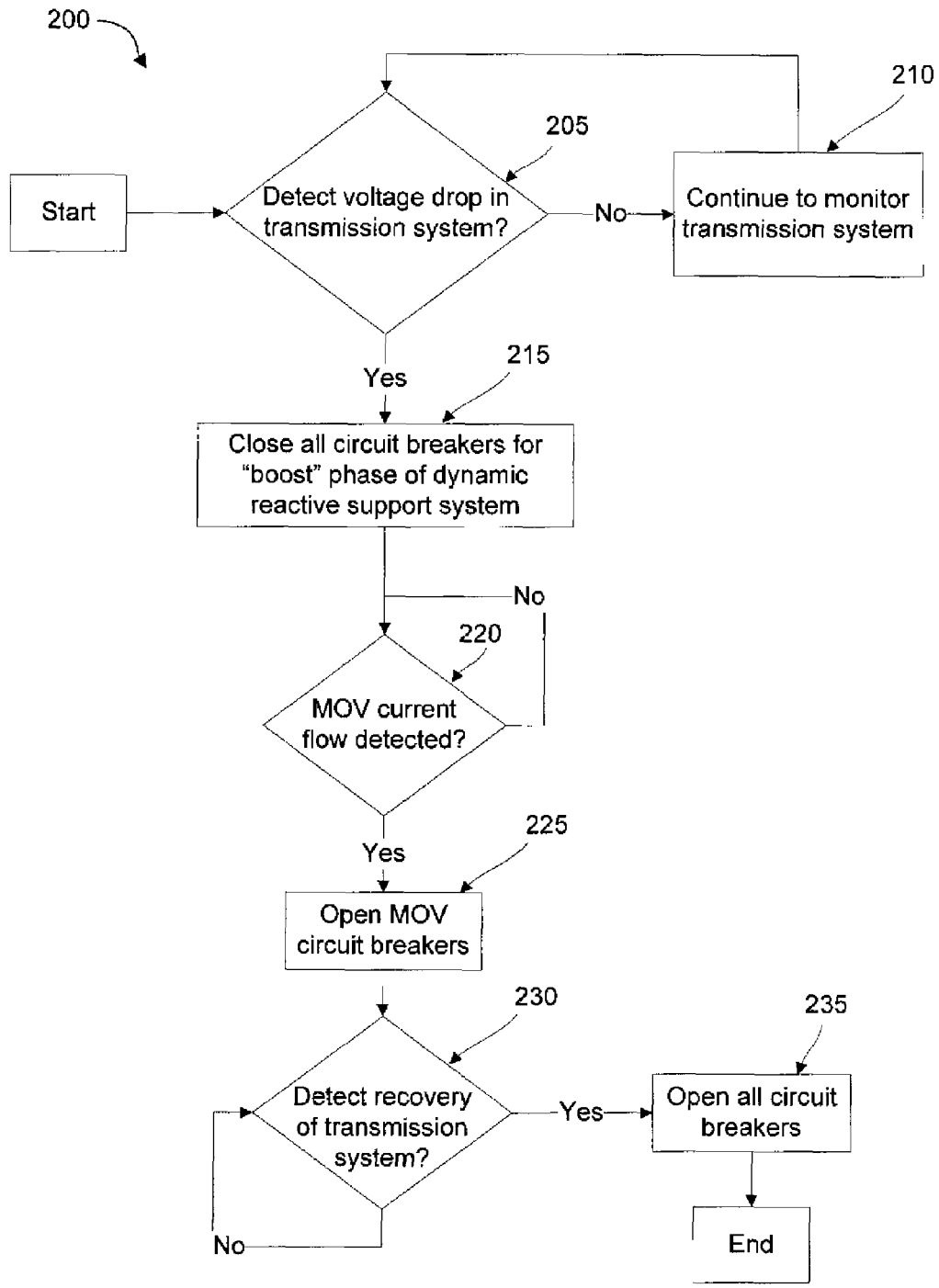

FIG. 2 shows an example flowchart of the control logic of a controller implementing a method to control a dynamic reactive support system in accordance with an embodiment of the invention.

Figure 3:
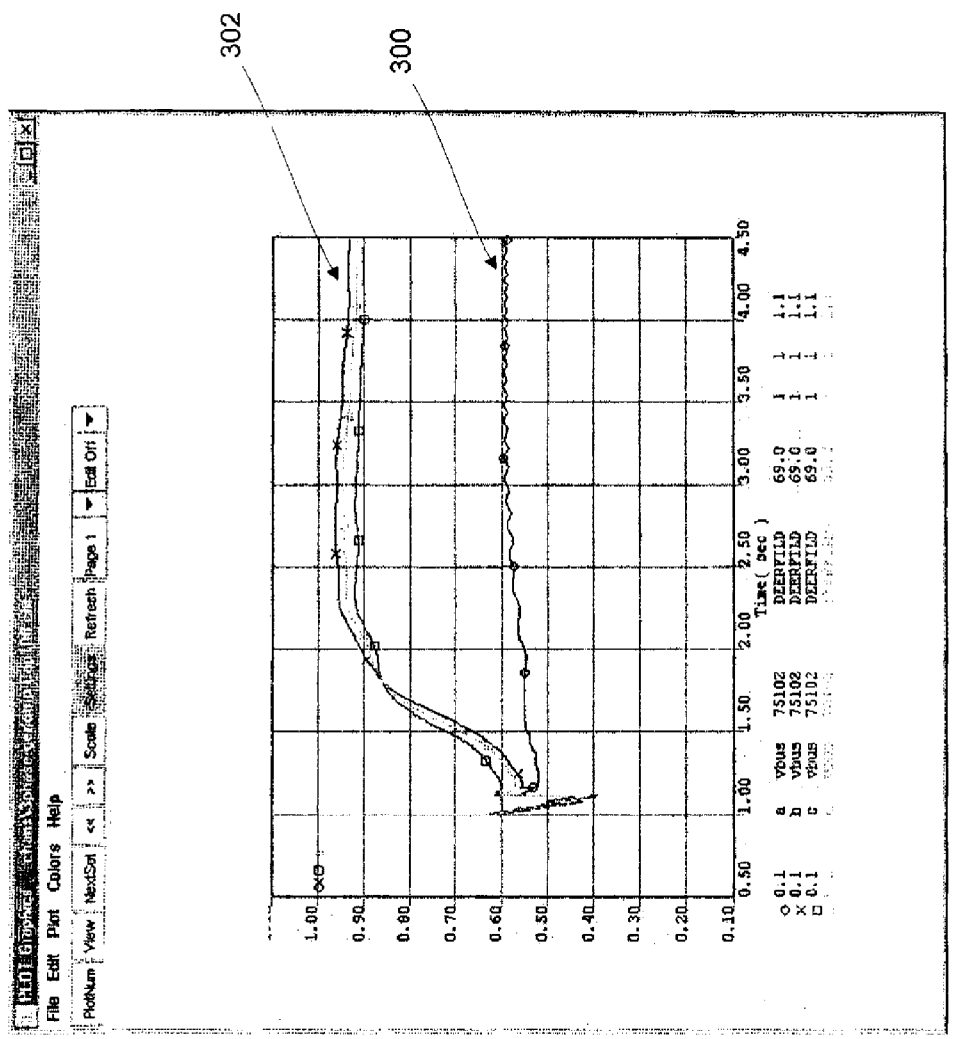

FIG. 3 shows a graphical representation of a time plot of a bus voltage recovering after a voltage drop in accordance with an example embodiment of the invention.

Figure 4:
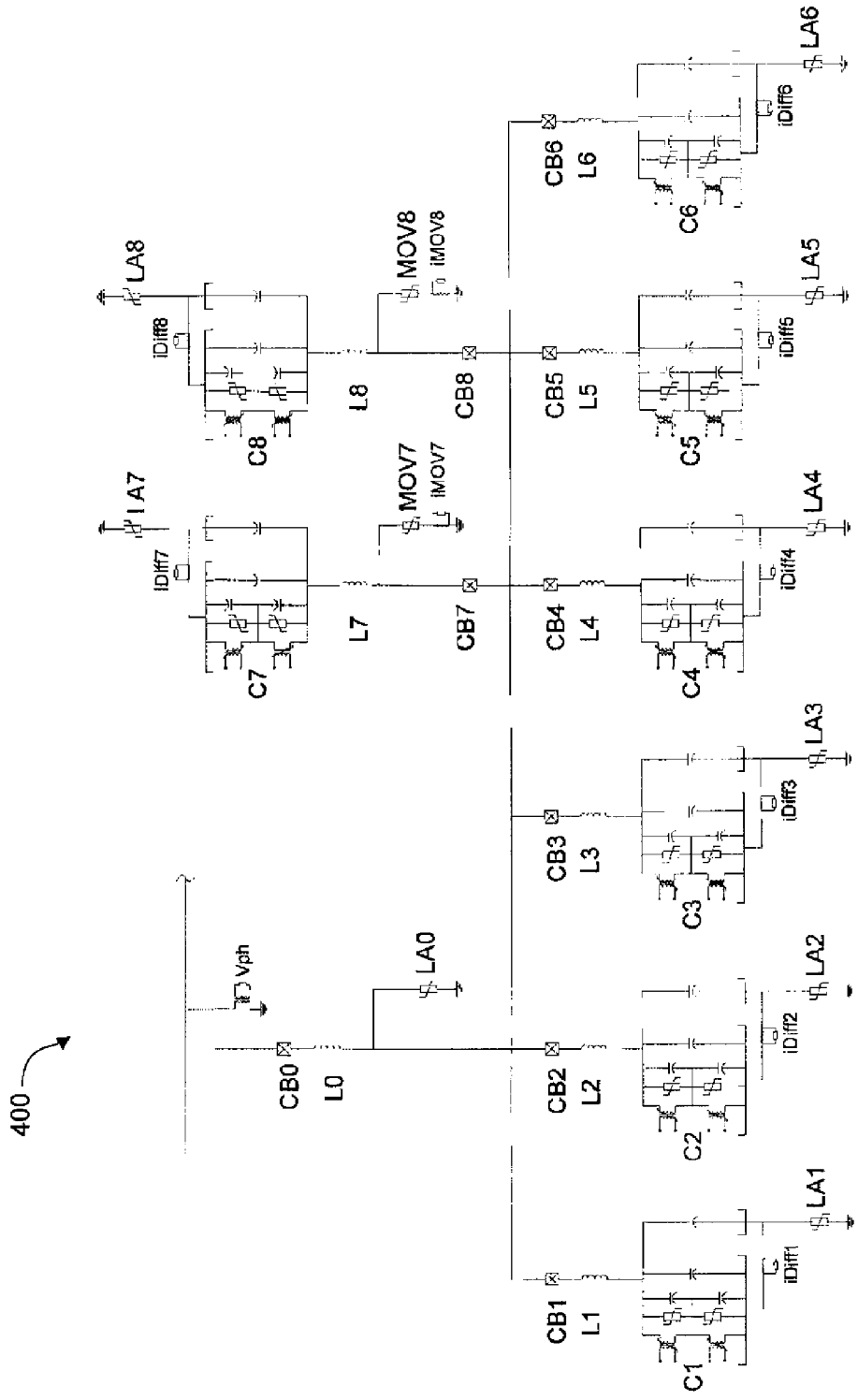

FIG. 4 shows a schematic diagram of an example dynamic reactive support system in accordance with an embodiment of the invention.

Figure 5:
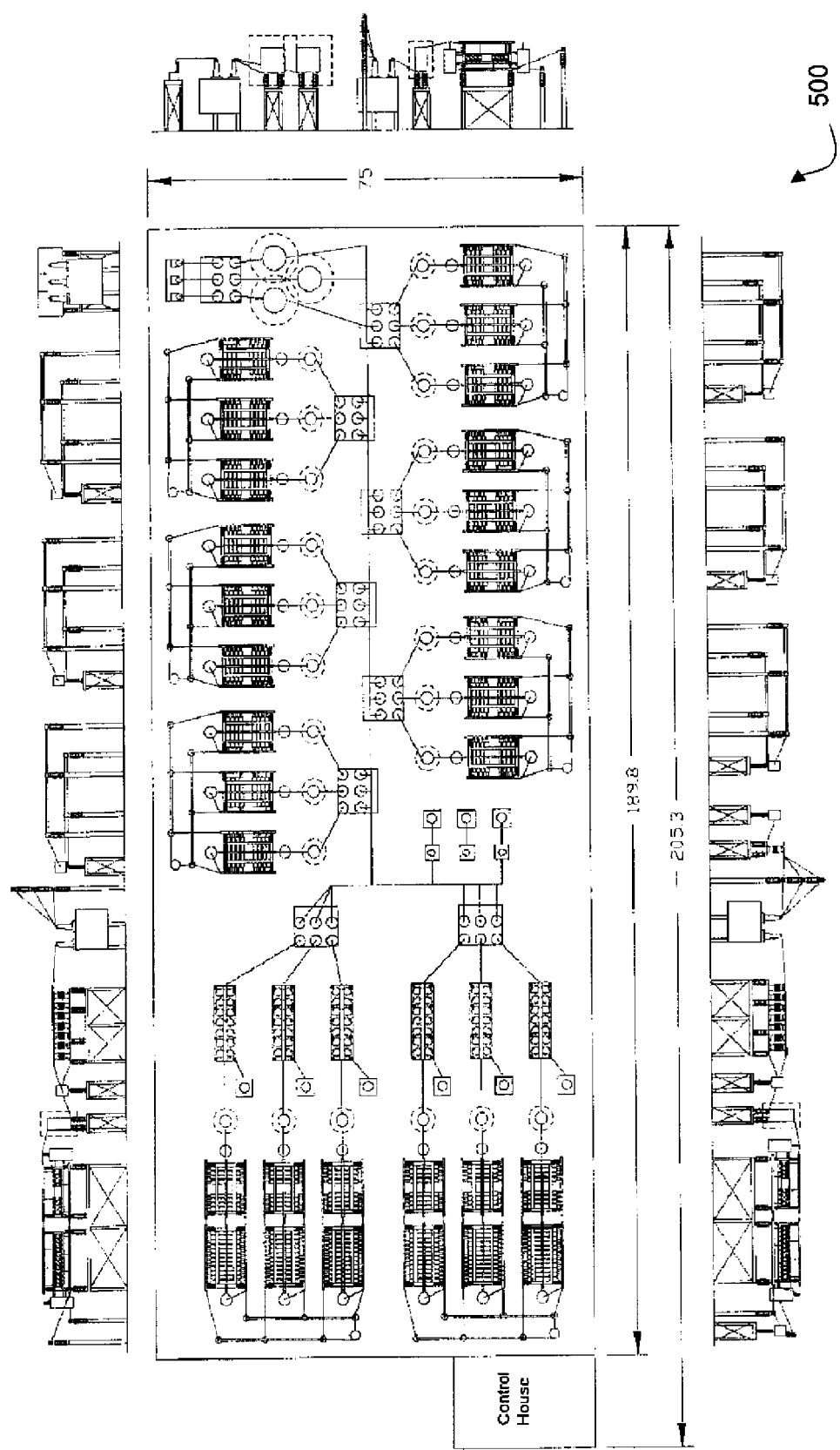

FIG. 5 shows a footprint diagram of the example embodiment of a dynamic reactive support system shown in FIG. 4 in accordance with an example embodiment of the invention.

DETAILED DESCRIPTION OF THE INVENTION

Example embodiments of the invention are directed to a dynamic reactive support system (DRSS) for contingency (e.g., post-fault) voltage recovery applications. The DRSS solution of the example embodiment of the invention includes the coordination of high-voltage capacitor and high-energy metal oxide varistor (MOV) technologies. An example embodiment of the invention features a high-capacitance, high reactive power "boost" section combined with a passive time-overvoltage (TOV) control for use in accelerating post voltage-depression recovery without exceeding acceptable voltage ranges in electric power system.

In an example embodiment of the invention, a shunt capacitor bank provides excess reactive power to a power transmission system experiencing a drop in voltage. To avoid overshooting or exceeding the desired voltage range with the supplied reactive power, yet avoid voltage collapse due to not enough supplemental reactive power being providing by the shunt capacitor bank, metal oxide varistors are integrated to limit any overvoltage transients caused by this excess reactive power to within acceptable levels. Though the metal oxide varistors can dissipate a lot of power during use over a short-duration, the use of the metal oxide varistors provides time to open the circuit breakers connecting the capacitors to the power transmission system without risk of voltage overshoot.

A device implementing an example embodiment of the invention inserts a high-magnitude of excess reactive power in the form of high-voltage capacitors to accelerate voltage recovery, and integrates high-energy MOVs to mitigate potential consequences of overvoltage conditions. The MOV combined with instrumentation (i.e. current transformers) also doubles as a fast-acting bus voltage indication to extract the excess reactive power from the system more quickly. Such use of the MOV reduces the time of MOV conduction and the duration of harmonic distortions of local voltages and currents caused by this conduction.

The equipment utilized in the embodiments of the invention is significantly less expensive when compared to conventional power semiconductor technologies and synchronous machines. Moreover, the embodiments of the invention have lead times that are significantly shorter than previous, more expensive, systems. Additionally, since the control device used to implement an embodiment of the invention is normally de-energized, the control device may have lower long-term failure rates and almost no steady-state power (Watts) losses.

Embodiments of the invention are described below with reference to block diagrams of systems, methods, apparatuses and computer program products according to an embodiment of the invention. Example embodiments of the invention are more fully described hereinafter with reference to the accompanying drawings, in which like numerals indicate like elements throughout the several drawings. Indeed, these inventions may be embodied in many different forms and should not be construed as limited to the embodiments set forth herein; rather, these embodiments are provided so that this disclosure will satisfy applicable legal requirements.

FIG. 1 shows an example basic dynamic reactive support system configuration in accordance with an embodiment of the invention. As shown in the embodiment of FIG. 1, the dynamic reactive support system 100 includes a main circuit breaker 110 connecting the overall dynamic reactive support system 100 to a power transmission system 105 (e.g., a substation bus), and one or more circuit breakers 115 connecting a shunt capacitor bank containing capacitors 120 and MOVs 125. A controller 130 is also implemented in the dynamic reactive support system 100 to monitor the MOVs' 125 current flow (i.e., to determine if the MOVs 125 are conducting) and to control the switching of circuit breakers 110 and/or 115.

This dynamic reactive support system 100 provides supplemental reactive power in the event a voltage drop (e.g., a significant voltage depression event) occurs in the power transmission system 105. When such an event occurs in an example embodiment of the invention, the main circuit breaker 110 is closed as well as each of the circuit breakers 115 connecting the bank of shunt capacitors 120 to the power transmission system. The greater the excess of reactive power supplied by the bank of shunt capacitors 120, the faster voltage will be recovered and the negative effects of the voltage suppression are lessened. This excess supply of reactive power supplied by the shunt capacitors is referred to as the "boost" phase of the implementation of the dynamic reactive support system 100.

However, if too much reactive power is supplied to the power transmission system 105 for too long, then overvoltaging the power transmission system 105 may occur, which has numerous undesirable effects on the power delivery system and its equipment. Therefore, to ensure that a large amount of capacitance is supplied to the power transmission system 105 quickly, yet is appropriately limited once the voltage levels recover, one or more of the capacitors 120 in the bank of shunt capacitors may be connected to at least one MOV 125. In an example embodiment of the invention, the MOVs 125 are zinc oxide varistors. The MOVs 125 operate both as an inhibitor of supplying too much reactive power to the power transmission system 105 and also act as an indicator to the controller 130 that the "boost" phase of supplying reactive power to the power transmission system 105 has ended or may soon have negative effects. MOVs 125 conduct current as a function of voltage, though it is not a linear relationship like a resistor. As a result, MOVs 125 have a threshold voltage which must be exceeded before current is conducted. Hence, when the MOV 125 begins conducting, then a large amount of reactive power has been supplied to the power transmission system 105.

Therefore, the indicator that the "boost" phase is over occurs when the MOV 125 begins conducting and an MOV current is generated. As a result, the MOVs 125 implemented in an embodiment of the invention may be "tuned" to indicate an overvoltage (or near overvoltage) event to show when the dynamic reactive support system 100 should begin to decrease (or at least not increase) the supply of reactive power from the bank of shunt capacitors 115. This decrease of reactive power may be implemented by having the controller 130 open one or more of the circuit breakers 110 and/or 115, either all at the same time or in stages, individually or in groups, etc. A more detailed description of the process by which the controller 130 controls the operation of the dynamic reactive support system 100 is described below with reference to FIG. 2.

FIG. 2 shows an example flowchart of the control logic of a controller implementing a method to control a dynamic reactive support system in accordance with an example embodiment of the invention. It will be understood that one or more blocks and/or combinations of blocks in FIG. 2 can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions below. These computer program instructions may also be stored in a computer-readable memory that can direct a computer or other programmable data processing apparatus to function in a particular manner including implementing the functions specified in the block or blocks.

Embodiments of the invention may also be implemented through an application program running on an operating system of a computer. In addition, or in the alternative, the application program (in whole or in part) may be located in remote memory or in storage to allow for the practice of embodiments of the invention where tasks are performed by remote processing devices linked through a communications network. It will also be understood that each block and/or combinations of blocks in FIG. 2 can be implemented by special purpose hardware-based computer systems that perform the specified functions or elements, or combinations of special purpose hardware and computer instructions. These embodiments also may be practiced with other computer system configurations, including hand-held devices, multi-processor systems, microprocessor based or programmable consumer electronics, mini-computers, mainframe computers, etc.

As shown in FIG. 2, the process 200 begins in block 205, where a power transmission system is monitored by a control device for the detection of a voltage drop (or significant voltage depression event) by monitoring the voltage levels of a power transmission system. If no voltage drop (or significant voltage depression event) is detected then block 210 is invoked to continue monitoring the power transmission system for such an event. However, if a voltage drop (or significant voltage depression event) is detected then block 215 is invoked.

In block 215 the controller enacts the dynamic reactive support system of shunt capacitors including those connected with MOVs by closing the circuit breaker connecting the dynamic reactive support system to the power transmission system (e.g., main circuit breaker 110 in FIG. 1). In other embodiments, the circuit breakers may be closed all at once, sequentially, or in various groupings or stages depending on the desired coordination of the capacitors to provide an abrupt or a gradual increase of supply of reactive power by the dynamic reactive support system. Once the circuit breakers are closed, the "boost" phase begins of supplying a large amount of reactive power to the power transmission system to provide a boost of reactive power to correct the detected voltage drop.

The MOVs connected to one or more capacitors in the bank of shunt capacitors of the dynamic reactive support system limit the capacitance supplied to the power transmission system. While a boost in reactive power requires a large amount of capacitance to be supplied in a short amount of time, too much capacitance supplied may have undesirable effects including overvoltage conditions that will stress system insulation, which can lead to flashovers, equipment damage (e.g., transformers, lightning arresters, etc.), and/or additional system faults. The use of the MOVs prevents these overvoltage events from occurring.

Next, block 220 is invoked where the controller monitors the MOVs to detect current flow (i.e., the MOV is conducting). This indicates that the system voltage has recovered to within the desired voltage range or is about to (or has) exceeded the desired recovery voltage range. Once this event is detected, block 225 is invoked where the circuit breakers connecting the capacitors utilizing the MOVs to the power transmission system are opened to disconnect the capacitors and prevent them from providing additional reactive power. In other embodiments, the capacitor segment with MOV circuit breakers may be opened all at once, sequentially, or in various groupings or stages depending on the desired coordination of the capacitors to provide an abrupt or a gradual decrease of supply of reactive power by the dynamic reactive support system.

While in some embodiments of the invention all of the shunt capacitors may be connected to dedicated MOVs, other embodiments may only have some capacitors connected to MOVs and others may not. In the latter embodiments, the capacitors connected to MOVs may be disconnected from the power transmission system before the other capacitors in the bank of shunt capacitors. The capacitors that remaining connected with the power transmission system may do so to continue to provide a supplemental source to the power transmission system. In block 230, the controller may detect that the power transmission system voltage (e.g., substation bus voltage) has recovered from its voltage drop event and that an additional supply of reactive power is no longer necessary. Once that event has occurred and the power transmission system has fully recovered (or has nearly fully recovered), then block 235 may be invoked to disconnect the dynamic reactive support system of the invention.

FIG. 3 is a graphical representation of a time plot of a bus voltage recovering after a voltage drop in accordance with an example embodiment of the invention. As shown in FIG. 3, a voltage drop in a bus voltage occurs at about 1.00 second. The lower line 300 (indicated by the circles) shows the power transmission system voltage if no dynamic compensation is provided to "boost" the bus voltage. The top line 302 (indicated by the "x" markings) shows the power transmission system voltage recovery resulting from the use of the shunt capacitors and MOVs of the dynamic reactive support system of the invention.

FIG. 4 is a detailed schematic diagram of an example of one embodiment of a dynamic reactive support system 400 in accordance with an example embodiment of the invention. The functionality and operation as described above in reference to the embodiment shown in FIG. 1 applies to the embodiment of the invention shown in FIG. 4.

FIG. 5 shows a footprint diagram of the example embodiment of a dynamic reactive support system 500 shown in FIG. 4 in accordance with an example embodiment of the invention. The devices shown in the dynamic reactive support systems 400 and 500 implementing an embodiment of the invention have a relatively smaller footprint and use much less land space than conventional support systems. Moreover, in the example embodiments of the invention there is no need for water cooling, as is applied in some conventional SVC applications. Further, there is no steady-state harmonic voltage or current issues requiring harmonic filter application and no noise issues in the example embodiments of the invention compared to conventional support systems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for supplying supplemental reactive power to a power transmission system comprising:
   detecting a voltage drop on a power transmission system;
   in response to detecting the voltage drop, connecting a plurality of shunt capacitors to the power transmission system, wherein each of the plurality of shunt capacitors is connected in parallel to a respective metal oxide varistor (MOV);

detecting a current flow in at least one of the MOVs; and upon detection of a current flow in the at least one of the MOVs, disconnecting the plurality of shunt capacitors from the power transmission system.

2. The method of claim 1, wherein connecting the plurality of shunt capacitors to the power transmission system includes closing at least one circuit breaker connecting the power transmission system to the plurality of shunt capacitors through the at least one of the MOVs.

3. The method of claim 2, wherein closing the at least one circuit breaker includes closing two or more circuit breakers sequentially.

4. The method of claim 2, wherein closing the at least one circuit breaker includes closing two or more circuit breakers simultaneously.

5. The method of claim 1, wherein disconnecting the plurality of shunt capacitors from the power transmission system includes opening at least one circuit breaker connecting the plurality of shunt capacitors through the at least one of the MOVs.

6. The method of claim 5, wherein opening the at least one circuit breaker includes opening two or more circuit breakers sequentially.

7. The method of claim 5, wherein opening the at least one circuit breaker includes opening two or more circuit breakers simultaneously.

8. The method of claim 5, wherein opening the at least one circuit breaker includes opening a first group of circuit breakers and a second group of circuit breakers, wherein the first group of circuit breakers is opened at a different time than the second group of circuit breakers.

9. A system for supplying supplemental reactive power to a transmission system comprising:

at least one circuit breaker connecting a shunt capacitor bank containing at least one shunt capacitor and at least one metal oxide varistor (MOV) connected in parallel; and a controller configured to:

detect a voltage drop on a power transmission system;

in response to detecting the voltage drop, close the at least one circuit breaker, wherein closing the at least one circuit breaker connects the at least one shunt capacitor to the power transmission system;

detect a current flow in the at least one MOV; and upon detection of a current flow in the at least one MOV, disconnect the at least one shunt capacitor from the power transmission system.

10. The system of claim 9, further comprising: a main circuit breaker, wherein the main circuit breaker connects the at least one circuit breaker connecting the shunt capacitor bank containing at least one shunt capacitor and at least one MOV to the power transmission system.

11. The system of claim 9, wherein the at least one MOV is a zinc oxide varistor.

12. The system of claim 9, wherein disconnecting the at least one shunt capacitor from the power transmission system includes opening the at least one circuit breaker connecting the at least one shunt capacitors through the at least one MOV.

13. The system of claim 12, wherein opening the at least one circuit breaker includes opening two or more circuit breakers simultaneously.

14. The system of claim 12, wherein opening the at least one circuit breaker includes opening a first group of circuit breakers and a second group of circuit breakers, wherein the first group of circuit breakers is opened at a different time than the second group of circuit breakers.

15. A method for supplying supplemental reactive power to a power transmission system comprising:

detecting a voltage drop on a power transmission system;

in response to detecting the voltage drop, connecting a plurality of shunt capacitors to the power transmission system, wherein a first portion of the plurality of shunt capacitors are directly connected to the power transmission system and a second portion of the plurality of shunt capacitors are each connected to the power transmission system with a respective metal oxide varistor (MOV) connected in parallel;

detecting a current flow in at least one of the MOVs; and upon detection of a current flow in the at least one of the MOVs, disconnecting at least the second portion of the plurality of shunt capacitors from the power transmission system.

16. The method of claim 15, further comprising:

subsequent to disconnecting the second portion of the plurality of shunt capacitors from the power transmission system, disconnecting the first portion of the plurality of shunt capacitors from the power transmission system.

17. The method of claim 15, further comprising:

subsequent to detecting a current flow in at least one of the MOVs, determining that a voltage level of the power transmission system has recovered; and in response to determining that the voltage level of the power transmission system has recovered, disconnecting the first portion of the plurality of shunt capacitors from the power transmission system.

18. The method of claim 15, wherein disconnecting the plurality of shunt capacitors to the power transmission system includes opening at least one circuit breaker connecting the plurality of shunt capacitors with the at least one of the MOVs.

19. The method of claim 18, wherein opening the at least one circuit breaker includes opening two or more circuit breakers simultaneously.

20. The method of claim 18, wherein opening the at least one circuit breaker includes opening a first group of circuit breakers and a second group of circuit breakers, wherein the first group of circuit breakers is opened at a different time than the second group of circuit breakers.

* * * * *